(12) United States Patent
Urakami et al.

(10) Patent No.: US 8,085,336 B2
(45) Date of Patent: *Dec. 27, 2011

(54) OPTICAL APPARATUS HAVING DEVICE FOR REMOVING FOREIGN SUBSTANCE

(75) Inventors: Toshifumi Urakami, Kawasaki (JP); Shoji Kaihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 514 days.

This patent is subject to a terminal disclaimer.

(21) Appl. No.: 12/126,718

(22) Filed: May 23, 2008

(65) Prior Publication Data

US 2008/0297646 A1   Dec. 4, 2008

(30) Foreign Application Priority Data

May 31, 2007   (JP) ................................. 2007-146018

(51) Int. Cl.
*H04N 5/225*   (2006.01)
*H04N 9/04*   (2006.01)

(52) U.S. Cl. ................. 348/340; 348/335; 348/207.99
(58) Field of Classification Search .................. None
See application file for complete search history.

(56) References Cited

U.S. PATENT DOCUMENTS

| | | | |
|---|---|---|---|
| 7,006,138 B2 | 2/2006 | Kawai | |
| 7,280,145 B2 * | 10/2007 | Takizawa et al. | 348/340 |
| 7,324,149 B2 | 1/2008 | Takizawa | |
| 7,609,315 B2 * | 10/2009 | Kawai | 348/340 |
| 2004/0047625 A1 * | 3/2004 | Ito et al. | 396/429 |
| 2007/0223966 A1 * | 9/2007 | Fujimoto | 399/123 |

* cited by examiner

*Primary Examiner* — Luong T Nguyen

(57) ABSTRACT

An optical apparatus includes a rectangular optical member provided on an optical axis, and a rectangular vibrating device stuck to the optical member close to and in parallel with one of four sides of the optical member and configured to vibrate the optical member in a wave fashion to have a plurality of nodes parallel with the one side. The vibrating device is configured to operate in two or more vibration modes differing from one another at least in number or positions of the plurality of nodes.

11 Claims, 14 Drawing Sheets

OPTICAL APPARATUS HAVING DEVICE FOR REMOVING FOREIGN SUBSTANCE

CROSS-REFERENCE TO RELATED APPLICATIONS

The present application is related to U.S. Pat. No. 7,978,220, entitled "Optical Apparatus Having Device For Removing Foreign Substance", filed on May 29, 2008.

Moreover, the present application is also related to U.S. Pat. No. 7,969,500, entitled "Optical Apparatus Having Device For Removing Foreign Substance", filed on May 29, 2008.

This application claims priority from Japanese Patent Application No. 2007-146018 filed May 31, 2007, which is hereby incorporated by reference herein in its entirety.

BACKGROUND OF THE INVENTION

1. Field of the Invention

The present invention relates to a technology for removing a foreign substance, such as dust, adhering to a surface of an optical member provided on an optical axis of an optical apparatus, such as an imaging apparatus.

2. Description of the Related Art

In imaging apparatuses, such as digital cameras, which perform imaging of a subject by converting a subject image into an electrical signal, an imaging light-beam is received by an image sensor. Then, a photoelectric conversion signal output from the image sensor is converted into image data. The image data is recorded on a recording medium, such as a memory card. A charge-coupled device (CCD) or a complementary metal-oxide semiconductor (CMOS) sensor can be used as the image sensor.

In such imaging apparatuses, an optical low-pass filter or an infrared cut filter is disposed on a subject side of the image sensor. When foreign substances, such as dust, adhere to the surfaces of the filter, the foreign substances produce black spots in a captured image. Consequently, visual quality of the image deteriorates.

In particular, in digital single-lens reflex cameras with interchangeable lenses, mechanical operating units, such as a shutter and a quick-return mirror, are disposed in the vicinity of an image sensor. Sometimes, foreign substances, such as dust, are generated by the operating units and adhere to the surface of the image sensor or the filter. In addition, when the lens is changed, a foreign substance, such as dust, may enter the camera body from an opening of a lens mount and may adhere to the surface of the image sensor or the filter.

In order to avoid such phenomena, U.S. Pat. Nos. 7,324,149 and 7,006,138 discuss technologies for providing a dust-proof screen, which transmits an imaging light-beam, on a subject side of an image sensor, and for vibrating the dust-proof screen using a piezoelectric element to remove a foreign substance, such as dust, adhering to the surface of the dust-proof screen.

More specifically, U.S. Pat. No. 7,324,149 discusses a camera in which a circular or polygonal dust-proof screen (dust-proof optical member) is disposed between an image sensor and a mechanical shutter and below a finder optical system. In addition, a vibrating member for vibrating a peripheral edge portion of the optical member is provided in the camera and causes the optical member to perform resonant vibrations while switching between first-order and second-order vibration modes each having point-symmetric nodes. Consequently, dust adhering to the surface of the optical member can be removed.

In a first camera discussed in U.S. Pat. No. 7,006,138, a rectangular optical member is disposed between the image sensor and the mechanical shutter and below the finder optical system. Paired piezoelectric elements are respectively attached along longer opposed sides of the optical member. The piezoelectric elements simultaneously vibrate and cause the optical member to perform first-order bending vibrations such that nodes are formed along the vicinity of each of shorter opposed sides of the optical member. Consequently, dust adhering to the surface of the optical member can be removed.

In a second camera discussed in U.S. Pat. No. 7,006,138, a rectangular optical member is disposed between the image sensor and the mechanical shutter and below the finder optical system. Two pairs of piezoelectric elements are respectively attached along longer opposed sides of the optical member. The two pairs of piezoelectric elements are disposed such that a polarization arrangement of an outer-peripheral-side one of the piezoelectric elements of each pair is shifted from the other (inner-peripheral-side one) of the piezoelectric elements. Then, periodic voltages are applied to the piezoelectric elements of each pair, respectively, by phase-shifting the voltages. Thus, a progressive wave progressing in a longitudinal direction of the optical member is generated. Consequently, dust adhering to the surface of the optical member can be moved.

However, the camera discussed in U.S. Pat. No. 7,324,149 requires that the image sensor, which generally has a rectangular imaging area, is provided with a dedicated dust-proof screen shaped in a circle, whose diameter is longer than a diagonal-line of the rectangular imaging area, or a regular polygon whose size is equivalent to that of the circle. Thus, a space to be wasted in design of the finder optical system is needed. In addition, there is a fear of reduction in optical performance of the camera.

The first camera discussed in U.S. Pat. No. 7,006,138 has a relatively high cost, because the two piezoelectric elements are attached along a pair of parallel sides of the rectangular optical member. In addition, because the first camera uses the first-order vibration mode, a difference in amplitude of the vibration between a central portion and a peripheral portion of the optical member is large. Thus, a difference in effects of removing a foreign substance between such portions of the surface of the optical member is likely to occur. The effects of removing a foreign substance vary with an outer shape, a thickness, Young's modulus, a density of the optical member. In a case where the first-order vibration is used, a resonant frequency may generate a low operation sound.

The second camera discussed in U.S. Pat. No. 7,006,138 also has a relatively high cost, because the second camera requires the two pairs of piezoelectric elements, i.e., four piezoelectric elements. In addition, because a progressive wave is generated by applying the phase-shifted periodic voltages to phase-shifted electrodes of the piezoelectric elements, a control process itself and circuits for performing the control process are complicated. In addition, an adjustment process for absorbing variation at production of cameras may be required.

SUMMARY OF THE INVENTION

The present invention is directed to an optical apparatus having a structure for removing a foreign substance, which can miniaturize an optical member and implement a simple control process and a simple circuit configuration at low cost and can prevent generation of noise.

According to an aspect of the present invention, an optical apparatus includes a rectangular optical member provided on an optical axis, and a rectangular vibrating device stuck to the optical member close to and in parallel with one of four sides of the optical member and configured to vibrate the optical member in a wave fashion to have a plurality of nodes parallel with the one side. The vibrating device is configured to operate in two or more vibration modes differing from one another at least in number or positions of the plurality of nodes.

According to another aspect of the present invention, the optical apparatus includes an imaging apparatus comprising an image sensor configured to photoelectrically convert a subject image, and wherein the optical member is located in front of the image sensor.

Furthermore, according to another aspect of the present invention, the two or more vibration modes include a vibration mode for vibrating the optical member in a wave fashion to have an even number of nodes, and a vibration mode for vibrating the optical member in a wave fashion to have an odd number of nodes.

Moreover, according to still yet another aspect of the present invention, the vibrating device includes a rectangular piezoelectric member, wherein the vibrating device is disposed such that a longer side thereof is parallel with one side of the optical member, and wherein a width of a shorter side of the vibrating device is equal to or less than ½ a wavelength of a vibration mode whose wavelength is longest among the two or more vibration modes.

Additionally, according to still yet another aspect of the present invention, the vibrating device is fixed to overlap a center line between nodes in each of the two or more vibration modes.

And also, according to yet another aspect of the present invention, the optical member includes a filter.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
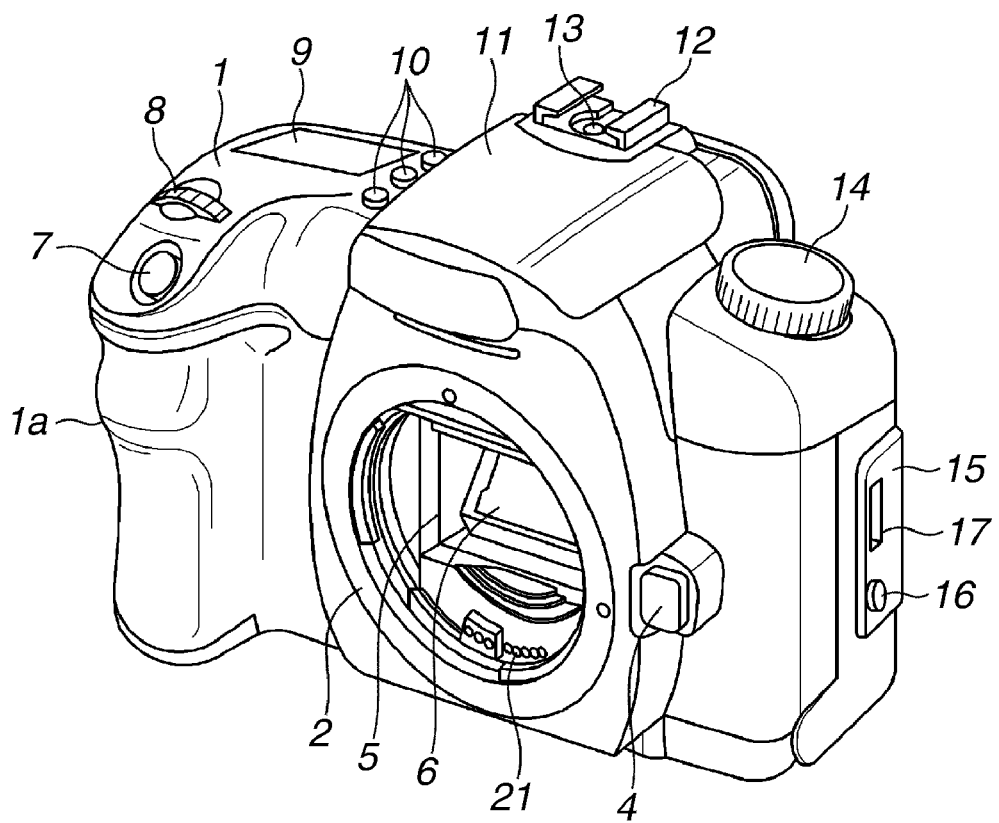
FIG. 1 is a perspective view of a front side of an example digital single-lens reflex camera according to an exemplary embodiment of the present invention.
Figure 2:
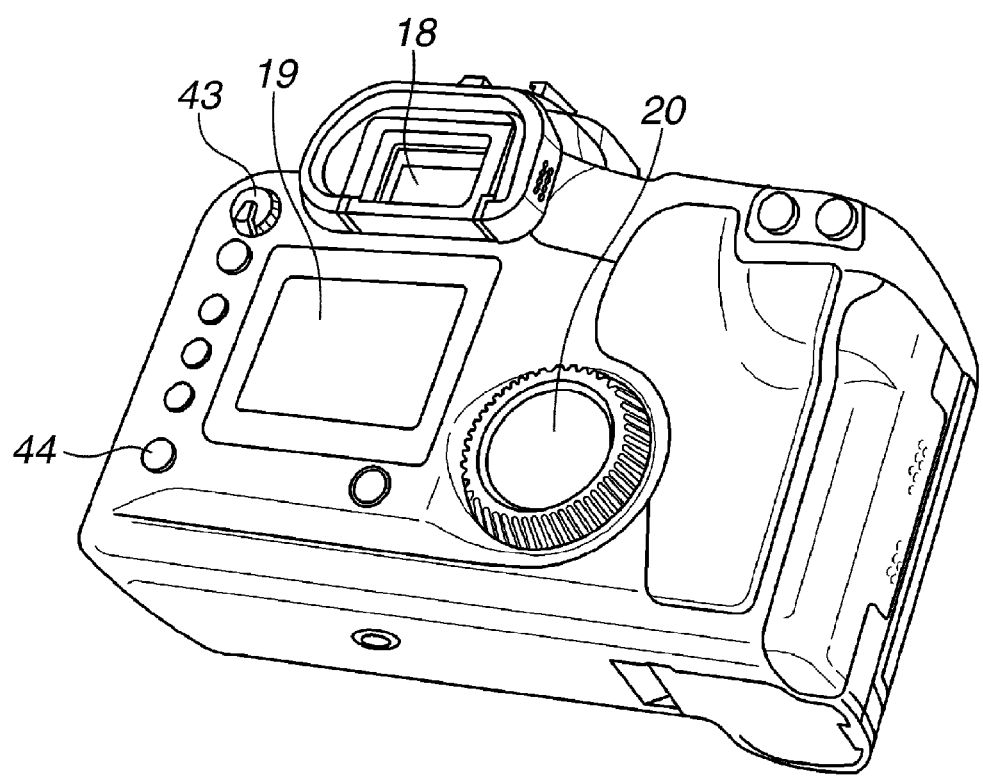
FIG. 2 is a perspective view of a rear side of the digital single-lens reflex camera according to the exemplary embodiment of the present invention.
Figure 3:
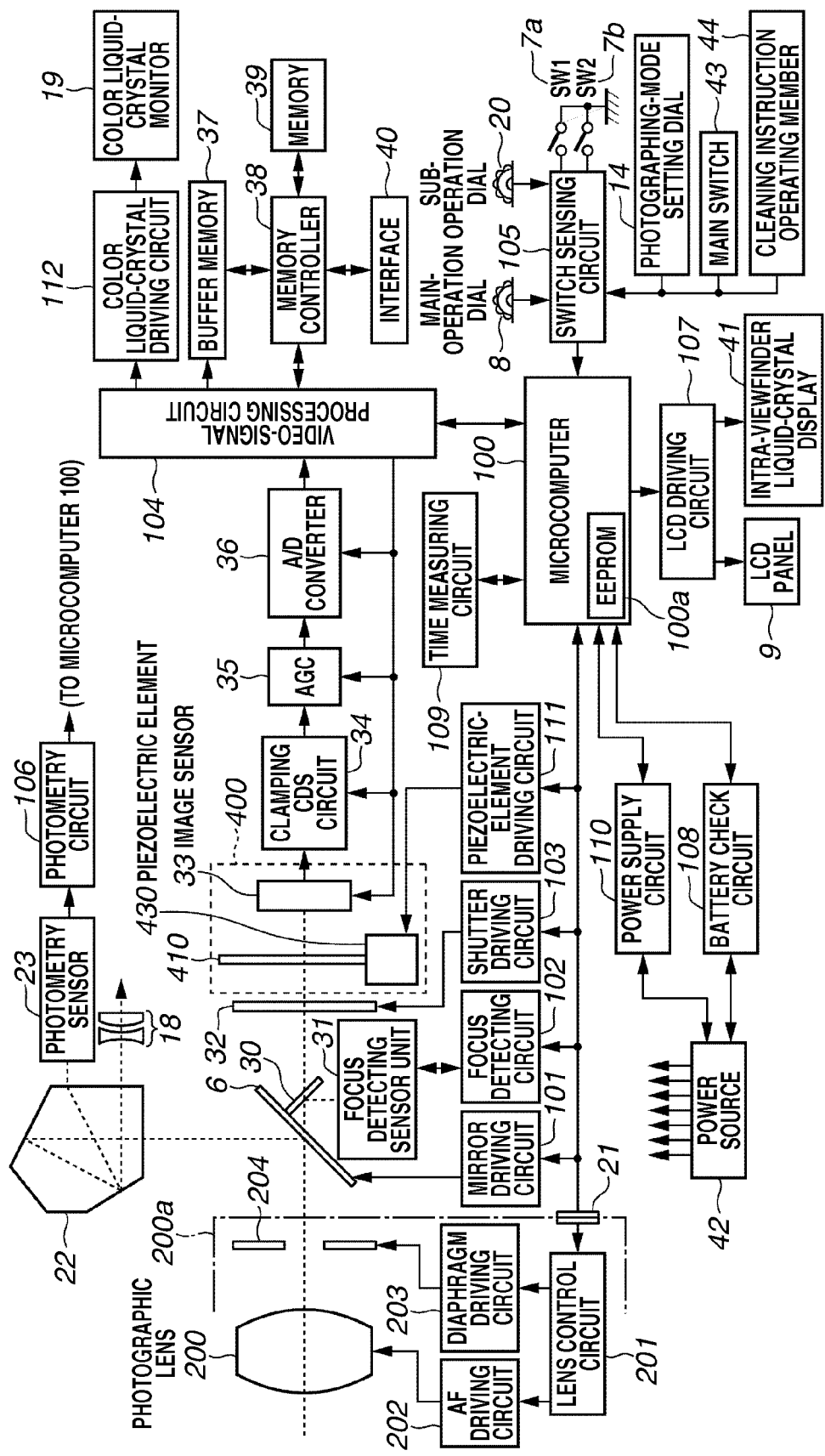
FIG. 3 is a block diagram illustrating an example electrical configuration of the digital single-lens reflex camera according to the exemplary embodiment of the present invention.

A digital single-lens reflex camera according to an exemplary embodiment of the present invention is described first with reference to FIGS. 1 through 3. FIGS. 1 and 2 illustrate an appearance of the digital single-lens reflex camera according to the exemplary embodiment of the present invention. FIG. 1 is a perspective view of the camera, which is taken from a front side (subject side) thereof. FIG. 1 illustrates the camera from which a photographic lens unit is removed. FIG. 2 is a perspective view of the camera, which is taken from a photographer side (rear side).

As illustrated in FIG. 1, a camera body 1 has a grip portion 1a protruding towards a subject so that a photographer can stably hold the camera during photographing.

A photographic lens unit 200a (see FIG. 3) is removably mounted on a lens mount 2 of the camera body 1. A mount contact 21 allows the camera body 1 to exchange a control signal, a status signal, and a data signal with the photographic lens unit 200a. In addition, electrical power is supplied from the camera body 1 to the photographic lens unit 200a via the mount contact 21. The mount contact 21 can be configured to allow light communication and audio communication in addition to electrical communication between the camera body 1 and the photographic lens unit 200a. A lens lock release button 4 is disposed on a side surface of the lens mount 2. The lens lock release button 4 can be pushed to remove the photographic lens unit 200a from the camera body 1.

The camera body 1 is provided with a mirror box 5, to which an imaging light-beam having passed through the photographic lens unit 200a is led. A main mirror (quick-return mirror) 6 is provided in the mirror box 5. The main mirror 6 can be held at an angle of 45° with respect to an imaging optical axis so as to lead the imaging light-beam to a pentagonal roof mirror 22 (see FIG. 3). The main mirror 6 can be held at a position retreating from the imaging optical axis to lead the imaging light-beam to an image sensor 33 (see FIG. 3).

A release button 7 serving as a photographing start switch, a main-operation dial 8 for setting a shutter speed and a lens F-number according to an operation mode at photographing, and an imaging top-surface operation mode setting button 10 are disposed on the side of the grip portion 1a at an upper part of the camera body 1. A part of operation results of these operating members is displayed on a liquid-crystal display (LCD) panel 9. A switch SW1 (7a in FIG. 3) is turned on by the first stroke of the release button 7. A switch SW2 (7b in FIG. 3) is turned on by the second stroke of the release button 7. The top-surface operation mode setting button 10 is used to determine which of a continuous photographing mode and a single photographing mode is selected by one push of the release button 7, and to set a self-timer photographing mode. Information on such settings is displayed on the LCD panel 9.

A flash unit 11, which can pop up from the camera body 1, and a shoe groove 12 and a flash contact 13, which can be used to mount en external flash unit, are provided at a central portion of the upper part of the camera body 1a.

A photographing-mode setting dial 14 is disposed to the right side of an upper part of the camera body 1.

An openable/closable external-terminal cover 15 is disposed on a side surface of the camera body 1, which is opposite to the grip portion 1a of the camera body 1. A video signal output jack 16 and a universal serial bus (USB) output connector 17, as an external interface, are mounted inside the external-terminal cover 15 of the camera body 1.

As illustrated in FIG. 2, a finder eyepiece window 18 is disposed at an upper part of the rear surface of the camera body 1. In addition, a color liquid crystal monitor 19 capable of displaying an image is disposed in the vicinity of the center of the rear surface of the camera body 1.

A sub-operation dial 20 is disposed laterally adjacent to the color liquid crystal monitor 19. The sub-operation dial 20 is an auxiliary unit for the main-operation dial 8. For example, in an automatic exposure (AE) mode of the camera, the sub-operation dial 20 is used for setting an exposure compensation amount for an optimal exposure value determined by an automatic exposure unit. In a manual mode, in which a user determines a shutter speed and a lens F-number, the shutter speed is determined using the main-operation dial 8, while the lens F-number is determined using the sub-operation dial 20. In addition, the sub-operation dial 20 is used also for selecting a captured image to be displayed on the color liquid crystal monitor 19.

A main switch 43 for starting and stopping an operation of the camera and a cleaning instruction operating member 44 for operating the camera in a cleaning mode are disposed on the rear surface of the camera body 1. As will be described in more detail below, the cleaning instruction operating member 44 is used for instructing the camera to vibrate an optical low-pass filter 410 (see FIGS. 3 and 5) so as to remove a foreign substance, such as dust, adhering to a surface of the optical low-pass filter 410. The camera can optionally be operated in the cleaning mode using the cleaning instruction operating member 44. Alternatively, the camera can automatically be operated in the cleaning mode at timing of turning on the main switch 43, or at timing of turning off the main switch 43, or at both the timings of turning on and off the main switch 43.

FIG. 3 is a block diagram of a primary electrical configuration of the digital single-lens reflex camera according to the present embodiment. In FIG. 3, components similar to those illustrated in FIGS. 1 and 2 are designated by reference numerals used to denote similar components illustrated in FIGS. 1 and 2. A central processing unit (hereinafter referred to as an "MPU") 100 including a microcomputer incorporated in the camera body 1 controls operations of the camera. The MPU 100 performs various processing on components of the camera and processes various instructions. An electrically erasable programmable read-only memory (EEPROM) 100a incorporated in the MPU 100 can store time information output from a time measuring circuit 109 and other various information.

A mirror driving circuit 101, a focus detecting circuit 102, a shutter driving circuit 103, a video-signal processing circuit 104, a switch sensing circuit 105, and a photometry circuit 106 are connected to the MPU 100. In addition, an LCD driving circuit 107, a battery check circuit 108, the time measuring circuit 109, a power supply circuit 110, and a piezoelectric-element driving circuit 111 are connected to the MPU 100. These circuits operate under the control of the MPU 100.

The MPU 100 communicates with a lens control circuit 201 in the photographic lens unit 200a via the mount contact 21. The mount contact 21 has also a function of sending a signal to the MPU 100 when the photographic lens unit 200a is connected to the camera body 1. Consequently, the lens control circuit 201 communicates with the MPU 100 to drive a photographic lens 200 and a diaphragm 204, which are provided in the photographic lens unit 200a, via an auto focus (AF) driving circuit 202 and a diaphragm driving circuit 203, respectively. Although FIG. 3 illustrates only a single lens element of the photographic lens 200, for convenience of drawing, actually, the photographic lens 200 can include a number of lens elements.

The AF driving circuit 202 includes, e.g., a stepping motor. The AF driving circuit 202 changes a position of a focus lens in the photographic lens 200 under the control of the lens control circuit 201 so that an imaging light-beam is focused on the image sensor 33. The diaphragm driving circuit 203 includes, e.g., an auto iris. The diaphragm driving circuit 203 changes an aperture of the diaphragm 204 under the control of the lens control circuit 201 to obtain an optical F-number.

The main mirror 6 is held at an angle of 45° with respect to the imaging optical axis illustrated in FIG. 3 and leads an imaging light-beam having passed through the photographic lens 200 to the pentagonal roof mirror 22. In addition, the main mirror 6 transmits a part of the imaging light-beam and leads the part of the imaging light-beam to a sub-mirror 30. The sub-mirror 30 leads the part of the imaging light-beam, which is transmitted by the main mirror 6, to a focus detecting sensor unit 31.

The mirror driving circuit 101 includes, e.g., a direct current (DC) motor and a gear train. The mirror driving circuit 101 drives the main mirror 6 to move to a position at which a user can observe a subject image through a finder or to a position at which the main mirror 6 retreats from the imaging optical axis. When the main mirror 6 is driven, the sub-mirror 30 moves to a position at which the imaging light-beam is led to the focus detecting sensor unit 31 or to a position at which the sub-mirror 30 retreats from the imaging optical axis.

The focus detecting sensor unit 31 includes a field lens disposed in the vicinity of an imaging plane (not shown), a reflecting mirror, a secondary imaging lens, a stop, and a line sensor including a plurality of charge-coupled devices (CCDs). The focus detecting sensor unit 31 performs a phase difference type focus detecting method. A signal output from the focus detecting sensor unit 31 is supplied to the focus detecting circuit 102. Then, the signal is converted into a subject image signal, which is then sent to the MPU 100. The MPU 100 performs a focus detecting operation according to the phase difference method using the subject image signal. Then, the MPU 100 determines a defocus amount and a defocus direction. Subsequently, the MPU 100 moves the focus lens in the photographic lens 200 to an in-focus position via the lens control circuit 201 and the AF driving circuit 202 according to the determined defocus amount and defocus direction.

The pentagonal roof mirror 22 reflects and converts an imaging light-beam reflected by the main mirror 6 into an erected non-reverse image. A photographer can observe a subject image from the finder eyepiece window 18 through the finder optical system. In addition, the pentagonal roof mirror 22 leads a part of the imaging light-beam to a photometry sensor 23. The photometry circuit 106 receives an output from the photometry sensor 23 and converts the received output into a luminance signal corresponding to each area of the observation plane, which is then output to the MPU 100. The MPU 100 calculates an exposure value based on the luminance signal.

A shutter unit (mechanical focal plane shutter) 32 is configured such that, when the photographer observes a subject image through the finder, a shutter leading curtain (first curtain) is at a light-shielding position and a shutter trailing curtain (second curtain) is at an exposure position. Subsequently, at photographing, the shutter leading curtain performs an exposure travel from the light-shielding position to the exposure position. Thus, a light beam from a subject passes through the shutter unit 32. Then, the image sensor 33 performs imaging. After the lapse of a shutter speed time, the shutter trailing curtain performs a light-shielding travel from the exposure position to the light-shielding position. Thus, imaging is completed. The shutter unit 32 is controlled by the shutter driving circuit 103 having received an instruction from the MPU 100.

An imaging unit 400 includes an optical low-pass filter 410, a piezoelectric element 430 serving as a piezoelectric member, and the image sensor 33, which are integrated into one unit. The image sensor 33 photoelectrically converts a subject image. In the present embodiment, a CMOS sensor is used as the image sensor 33. However, any other imaging devices of various types, such as a CCD type, a CMOS type, and a charge injection device (CID) type, can be used as the image sensor 33. The optical low-pass filter 410, which is located in front of the image sensor 33, is a single birefringent plate that is made of quartz and has a rectangular shape. The piezoelectric element 430 is a single-plate piezoelectric device and can be vibrated by the piezoelectric element driving circuit 111 having received an instruction from the MPU 100. The Vibration of the piezoelectric element 430 is transmitted to the optical low-pass filter 410.

A clamping correlated double sampling (CDS) circuit 34 performs basic analog processing on a signal before analog-to-digital (A/D) conversion of the signal. The clamping CDS circuit 34 can change a clamp level. An automatic gain controller (AGC) 35 also performs basic analog processing on a signal before A/D conversion of the signal. The AGC 35 can change a basic AGC level. An A/D converter 36 converts an analog signal output from the image sensor 33 into a digital signal.

The video-signal processing circuit 104 performs general hardware-based image processing, such as gamma/knee processing, filtering processing, and information synthesis processing for a monitor display, on digital image data. The video-signal processing circuit 104 outputs image data for a monitor display. The image data is displayed on the color liquid crystal monitor 19 via a color liquid-crystal driving circuit 112. In addition, the video-signal processing circuit 104 can store image data in a buffer memory 37 via a memory controller 38 according to an instruction from the MPU 100. Further, the video-signal processing circuit 104 can compress image data in, e.g., a JPEG format. When images are continuously captured in, e.g., a continuous shooting mode, the video-signal processing circuit 104 temporarily stores the image data in the buffer memory 37. Then, the video-signal processing circuit 104 sequentially reads out unprocessed image data from the buffer memory 37 via the memory controller 38. Consequently, the video-signal processing circuit 104 can sequentially perform image processing and compression processing, regardless of a rate of inputting the image data from the A/D converter 36.

The memory controller 38 has functions of storing image data, which is input from an external interface 40, in the memory 39, and outputting image data, which is stored in the memory 39, via the external interface 40. The video-signal output jack 16 and the USB output connector 17 illustrated in FIG. 1 correspond to the external interface 40. A flash memory, which is mountable in and demountable from the camera body 1, can be used as the memory 39.

The switch sensing circuit 105 transmits a signal input according to an operating state of each switch to the MPU 100. The switch SW1 (7a) is turned on by the first stroke (half press) of the release button 7. The switch SW2 (7b) is turned on by the second stroke (full press) of the release button 7. When the switch SW2 (7b) is turned on, an instruction to start photographing is transmitted to the MPU 100. The main-operation dial 8, the sub-operation dial 20, the photographing-mode setting dial 14, the main switch 43, and the cleaning instruction operating member 44 are connected to the switch sensing circuit 105.

The LCD driving circuit 107 drives the LCD panel 9 and an intra-viewfinder liquid-crystal display unit 41 according to an instruction from the MPU 100.

The battery check circuit 108 checks a level of a battery according to an instruction from the MPU 100 and sends a result of checking the level to the MPU 100. A power source 42 supplies electrical power to each of the components of the camera.

The time measuring circuit 109 measures a time period from a moment, at which the main switch 43 is turned off, to a moment, at which the main switch 43 is turned on, and a date. The time measuring circuit 109 sends a result of measuring the time period to the MPU 100 according to an instruction from the MPU 100.

Figure 4:
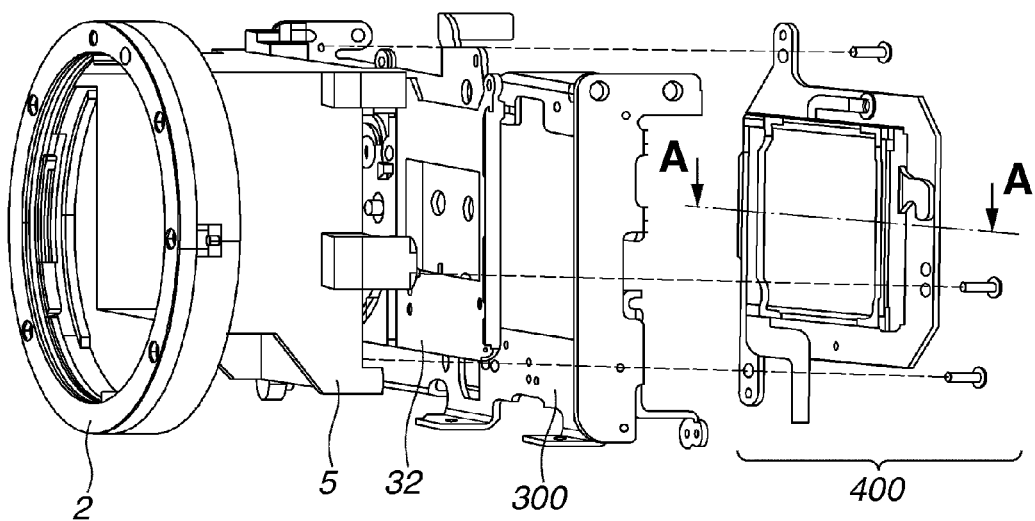
FIG. 4 is an exploded perspective view of a configuration of the inside of a camera, which illustrates a structure for holding an imaging unit and a neighborhood thereof.
Figure 5:
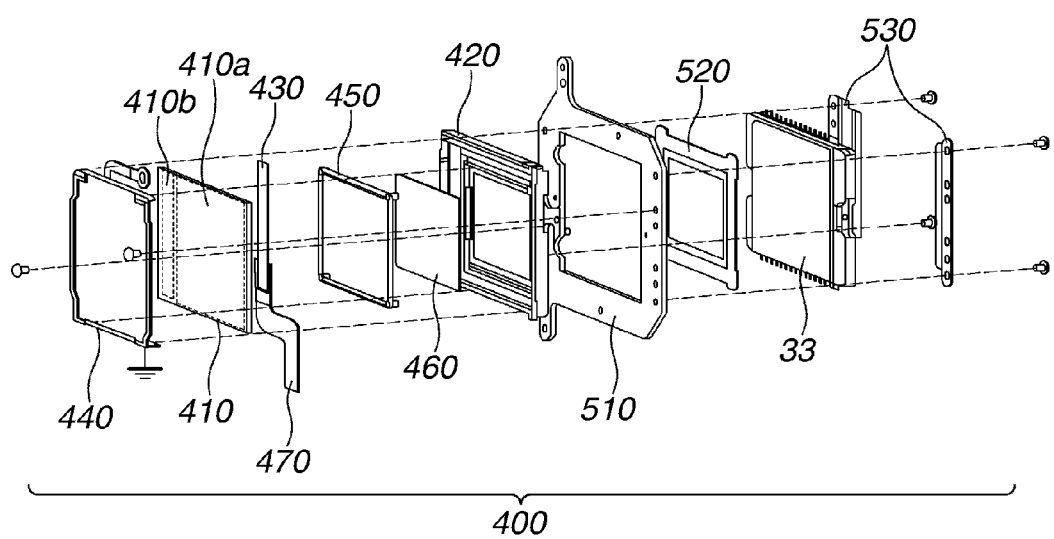
FIG. 5 is an exploded perspective view illustrating a configuration of the imaging unit.

Next, a foreign substance removing structure for vibrating the optical low-pass filter 410 according to the present embodiment is described below with reference to FIGS. 4 to 7. FIG. 4 is an exploded perspective view of a configuration of the inside of the camera, which illustrates a structure for holding the imaging unit 400 and a neighborhood thereof. FIG. 5 is an exploded perspective view illustrating a configuration of the imaging unit 400.

As illustrated in FIG. 4, the mirror box 5 and the shutter unit 32 are provided on a subject side of a body chassis 300, which is a framework of the camera body 1, in the order from the subject side. The imaging unit 400 is provided on a photographer side of the body chassis 300. The imaging unit 400 is adjusted and fixed in position such that the imaging plane of the image sensor 33 is located at predetermined distance from and in parallel with a mounting surface of the lens mount 2, which serves as a reference for mounting the photographic lens unit 200a.

As illustrated in FIG. 5, the optical low-pass filter 410 is a single birefringent plate that is made of quartz and has a rectangular shape. The optical low-pass filter 410 corresponds to an optical member provided on the optical axis. The optical low-pass filter 410 has a peripheral portion 410b, on which the piezoelectric element 430 is disposed, on one side of an imaging effective area 410a. The optical low-pass filter 410 is asymmetric with respect to a direction (horizontal direction of the camera, as viewed in FIGS. 1 and 2) perpendicular to the imaging optical axis (center axis) of the camera. An optical coating is applied to the surface of the optical low-pass filter 410.

The piezoelectric element 430 is shaped like a single-plate rectangular strip. The piezoelectric element 430 is bonded to and held at (stuck to) the peripheral portion 410b of the optical low-pass filter 410 such that a longer side of the piezoelectric element 430 is parallel with a shorter side (side edge) of the optical low-pass filter 410. The piezoelectric element 430 corresponds to a rectangular vibrating device for vibrating the optical member. That is, the piezoelectric element 430 is stuck to the optical low-pass filter 410 close to and in parallel to one of the four sides of the optical low-pass filter 410 and vibrates the optical low-pass filter 410 in a wave fashion to have a plurality of nodes parallel with the one side.

An optical low-pass filter holding member 420 made of plastic or metal holds the optical low-pass filter 410 and is fixed to an image sensor holding member 510 with screws.

A piezoelectric element flexible printed-circuit board 470 for applying a voltage to the piezoelectric element 430 is bonded and fixed to the piezoelectric element 430. The piezoelectric element 430 performs mainly extensional vibrations in a direction perpendicular to the optical axis in response to a voltage applied thereto from the flexible printed-circuit board 470. Thus, the piezoelectric element 430 resonates (vibrates) the optical low-pass filter 410. Consequently, a foreign substance adhering to the surface of the optical low-pass filter 410 can be removed therefrom.

Figure 9A:
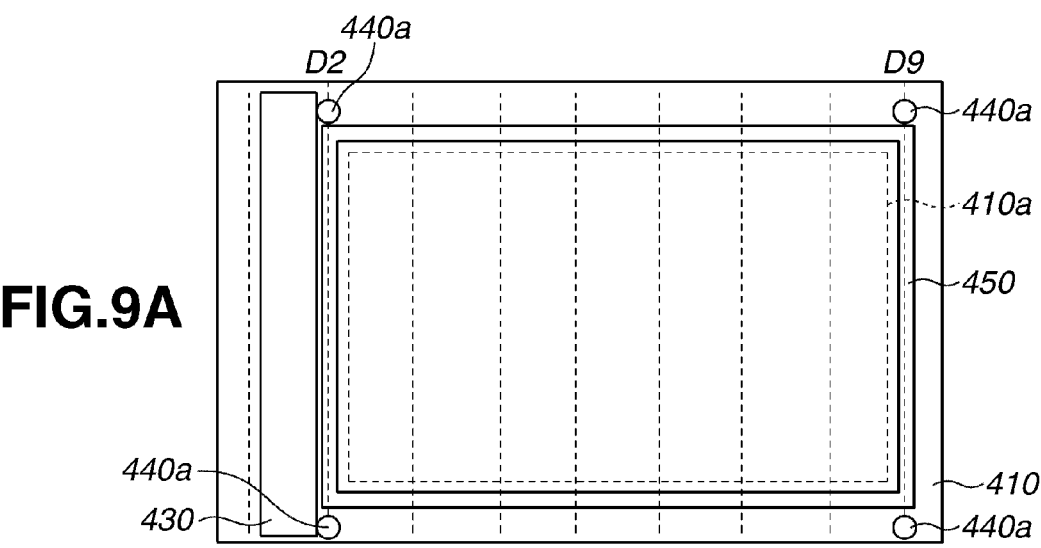
FIGS. 9A and 9B illustrate the vibration configurations of the optical low-pass filter and the piezoelectric element and a position at which the optical low-pass filter is supported.
Figure 10:
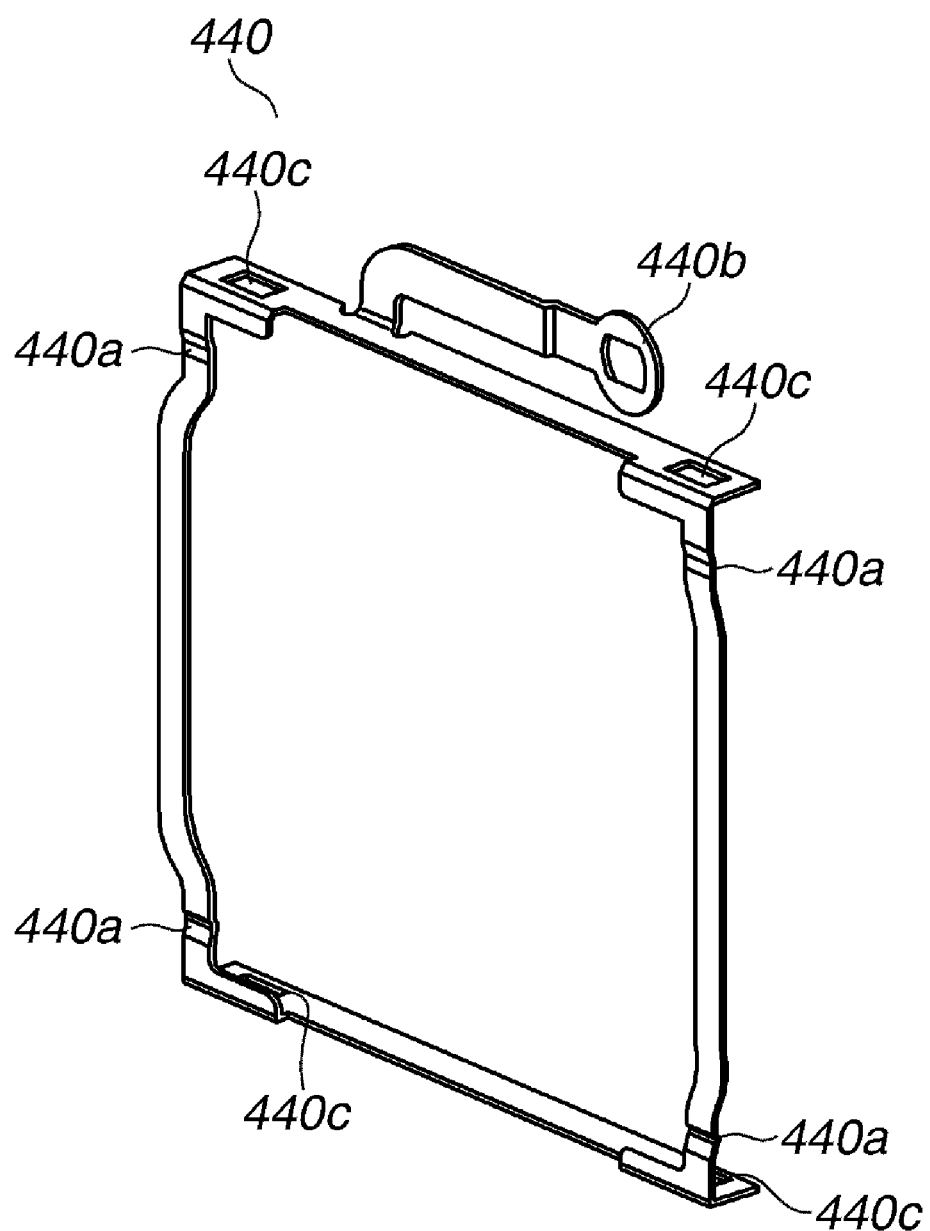
FIG. 10 is a perspective view of a biasing member.

A biasing member 440 contacts the optical low-pass filter 410 at four places outside the imaging effective area 410a and biases the optical low-pass filter 410 in the direction of the optical axis (see FIGS. 9A and 10). The biasing member 440 is caught and held by the optical low-pass filter holding member 420. The biasing member 440 is grounded. The surface (surface on which the optical coating is applied) of the optical low-pass filter 410, which contacts the biasing member 440, is grounded. Consequently, a foreign substance, such as dust, can be reduced from electrostatically adhering to the surface of the optical low-pass filter 410.

A cross-sectionally substantially-circular frame-like elastic member 450 is closely-attached and sandwiched between the optical low-pass filter 410 and the optical low-pass filter holding member 420. A force for closely attaching the elastic member 450 therebetween is determined by a biasing force of the biasing member 440 in the direction of the optical axis. The elastic member 450 can be made of rubber. Alternatively, as long as the elastic member 450 is formed of an elastic material, high molecular weight polymers, such as a boron polymer and a plastic polymer, can be used as the elastic material.

An optical member 460 is obtained by bonding together a phase plate (depolarization plate), an infrared cut filter, and a birefringent plate whose refracting direction differs from that of the optical low-pass filter 410 by 90°. The optical member 460 is bonded and fixed to the optical low-pass filter holding member 420.

The image sensor holding member 510, which has a plate-like shape, has a rectangular opening. The image sensor 33 is securely fixed to the image sensor holding member 510 such that the image sensor 33 is exposed from the rectangular opening. The image sensor holding member 510 has arm portions used to fix the image sensor holding member 510 to the mirror box 5 with screws at three places.

A mask 520 for preventing unwanted light from being incident on the image sensor 33 from outside an imaging optical path is held by being closely attached and sandwiched between the optical low-pass filter holding member 420 and the image sensor 33.

Paired left and right plate-spring-like image sensor biasing members 530 are fixed to the image sensor holding member 510 with screws and press the image sensor 33 against the image sensor holding member 510.

With the above-described configuration, the optical low-pass filter 410 is vibratably supported by the biasing member 440 and the elastic member 450 by being sandwiched therebetween. Although described below in detail, a desirable support position (support portion), at which the optical low-pass filter 410 is supported, is located in the vicinity of a node of vibration of the optical low-pass filter 410. The term "node" is defined as a position at which the amplitude of the vibration is substantially zero.

Figure 6:
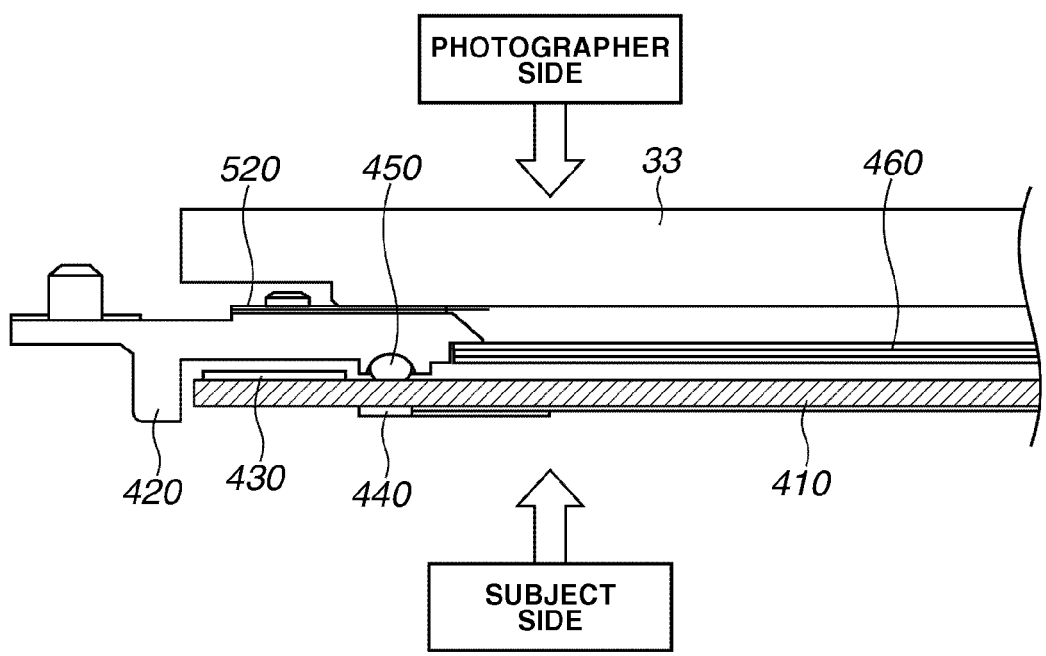
FIG. 6 is a cross-sectional view taken along line A-A illustrated in FIG. 4.

FIG. 6 is a cross-sectional view taken on line A-A illustrated in FIG. 4. The image sensor holding member 510 is omitted in FIG. 6. A photographer-side surface of the mask 520 contacts the image sensor 33. A subject-side surface of the mask 520 contacts the optical low-pass filter holding member 420. A double-sided adhesive tape is fixed to each of the photographer side and the subject side of the mask 520. The optical low-pass filter holding member 420 is hermetically-closed and fixedly-held by the image sensor 33 with the double-sided adhesive tape. The optical member 460 is held by a predetermined holding portion of the optical low-pass filter holding member 420 by bonding an outer periphery of the optical member 460 thereto. Consequently, a space enclosed by the optical low-pass filter holding member 420, the image sensor 33, the mask 520, and the optical member 460 is sealed. Thus, a hermetically-closed space is formed, which is capable of preventing intrusion of a foreign substance, such as dust.

On the other hand, the photographer-side surface of the elastic member 450 contacts the optical low-pass filter holding member 420. The subject-side surface of the elastic member 450 contacts the optical low-pass filter 410. Because the optical low-pass filter 410 is biased towards the image sensor 33 by an elastic force of the biasing member 440, the elastic member 450 is deformed and is closely attached to the optical low-pass filter 410 and the optical low-pass filter holding member 420 without space between the elastic member 450 and each of the optical low-pass filter 410 and the optical low-pass filter holding member 420. Consequently, a space enclosed by the optical low-pass filter 410, the optical low-pass filter holding member 420, the elastic member 450, and the optical member 460 is sealed. Thus, a hermetically-closed space is formed, which is capable of preventing intrusion of a foreign substance, such as dust.

Figure 7:
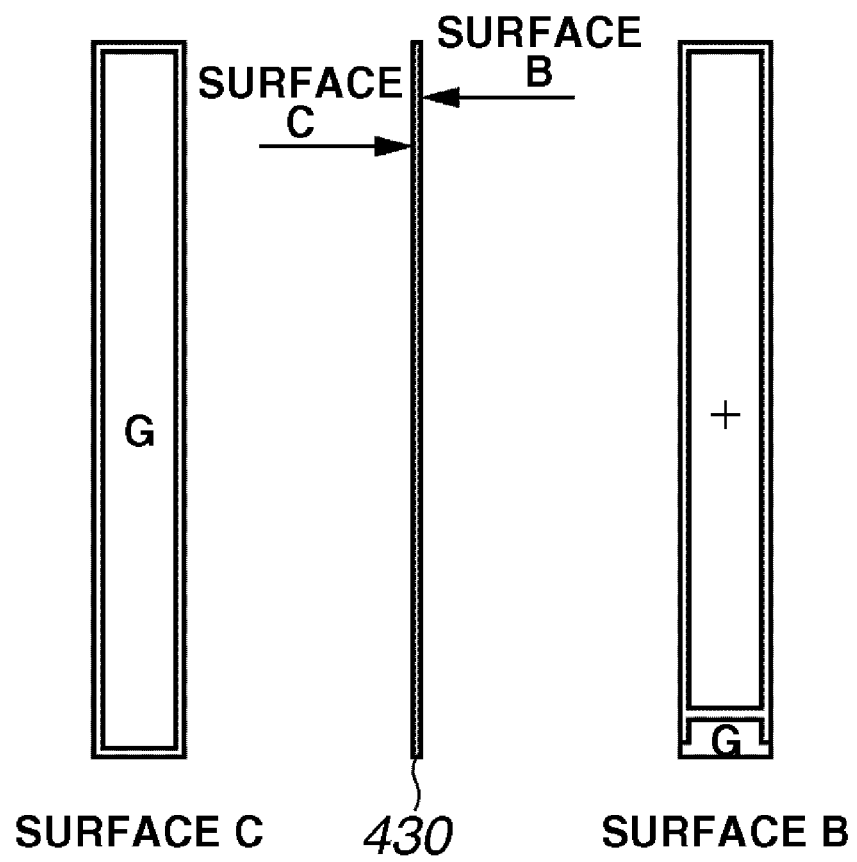
FIG. 7 illustrates a piezoelectric element in detail.

FIG. 7 illustrates the piezoelectric element 430 in detail. As illustrated in FIG. 7, a surface B of the piezoelectric element 430 is divided into a +phase portion, which is used to excite a stationary wave vibration in the optical low-pass filter 410, and a G phase portion. A surface C of the piezoelectric element 430 is electrically connected to the G phase portion of the surface B with an electrically conductive material (not shown) to be maintained at the same electric potential level as that of the G phase portion of the surface B. The piezoelectric element flexible printed-circuit board 470 is fixed to the surface B by adhesive-bonding. Thus, predetermined voltages can be applied to the +phase portion and the G phase portion independent of each other. The surface C is fixed to the optical low-pass filter 410 by adhesive-bonding such that the piezoelectric element 430 and the optical low-pass filter 410 move integrally with each other.

Figure 8:
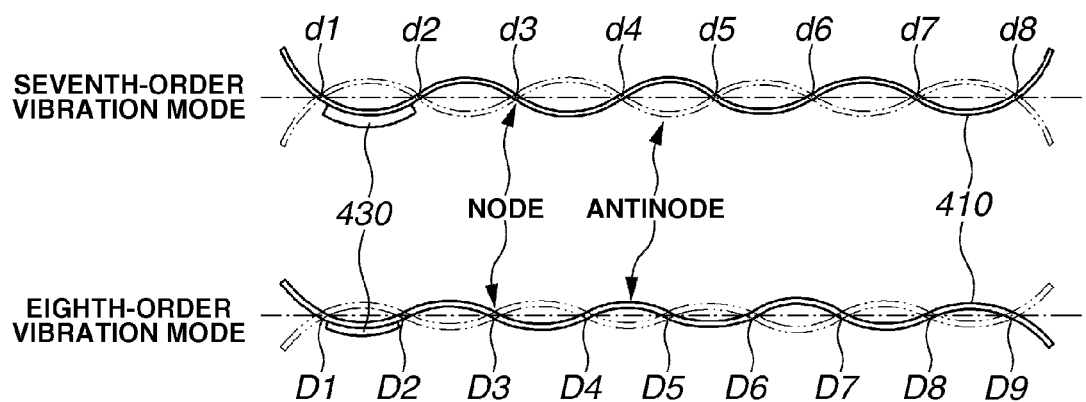
FIG. 8 is a side view illustrating vibration configurations of an optical low-pass filter and a piezoelectric element.

Next, a manner of vibration of the optical low-pass filter 410, which is performed as an operation for removing a foreign substance, is described below with reference to FIG. 8. FIG. 8 is a side view illustrating only the optical low-pass filter 410 and the piezoelectric element 430 provided integrally with the optical low-pass filter 410, which is taken by extracting only the optical low-pass filter 410 and the piezoelectric element 430 from the imaging unit 400. FIG. 8 illustrates changes of states (vibration configurations) of the optical low-pass filter 410 and the piezoelectric element 430 when a driving voltage is applied to the piezoelectric element 430.

When a positive voltage is applied to the +phase portion of the piezoelectric element 430 via the piezoelectric element flexible printed-circuit board 470, and the electric potential level of the G phase portion is set to be a ground level (0 volts), the +phase portion of the piezoelectric element 430 shrinks in a perpendicular-to-plane direction and expands in an in-plane direction. Accordingly, the optical low-pass filter 410 joined with the piezoelectric element 430 receives a force of enlarging a junction surface in an in-plane direction from the piezoelectric element 430. Thus, the optical low-pass filter 410 is deformed such that a surface thereof at the side of the junction surface between the optical low-pass filter 410 and the piezoelectric element 430 is convex. That is, when a positive voltage is applied to the +phase portion, bending deformations are caused in the optical low-pass filter 410, as indicated by solid lines illustrated in FIG. 8. On the other hand, when a negative voltage is applied to the +phase portion, the piezoelectric element 430 causes deformations in which directions of expanding and shrinking the piezoelectric element 430 are opposite to those of expanding and shrinking the piezoelectric element 430 when a positive voltage is applied to the +phase portion. Consequently, bending deformations are caused in the optical low-pass filter 410, as indicated by double-dashed-chain lines illustrated in FIG. 8.

Thus, when the voltage to be applied to the +phase portion is periodically changed in a range between predetermined positive and negative values while the electric potential of the G phase portion is maintained at the ground level, stationary wave vibrations are caused to periodically switch between the convex and concave surfaces of the optical low-pass filter 410. Even in a case where a low voltage is applied to the +phase portion, large amplitudes of vibrations can be obtained by setting a frequency of such a periodic voltage at a value in the vicinity of a resonant frequency of an inherent mode of the optical low-pass filter 410. Thus, this method is very efficient. The resonant frequency of the optical low-pass filter 410 has a plurality of values. Consequently, the optical low-pass filter 410 can be vibrated in vibration modes of different orders by applying a voltage thereto at each of the values of the resonant frequency.

Thus, as illustrated in FIG. 8, nodes (d1, d2, . . . , D1, D2, . . . ) and antinodes are alternately generated in a stationary wave vibration. The nodes of a vibration are located at positions at each of which the amplitude of the vibration is substantially zero. The antinodes of the vibration are located at positions at each of which the amplitude has a maximum value between associated adjacent nodes. In order to remove a foreign substance, such as dust, adhering to the surface of the optical low-pass filter 410, it is required to apply a force greater than an adhesion force to the foreign substance, that is, to apply an acceleration to the foreign substance. However, the amplitude is substantially zero at each node of a vibration. Therefore, the acceleration is substantially zero at each node. Consequently, the foreign substance cannot be removed against the adhesion force. Accordingly, when the optical low-pass filter 410 is vibrated only in one vibration mode, the foreign substance is left on a part of the optical low-pass filter 410, which corresponds to a node of the vibration.

In order to solve this problem, after the optical low-pass filter 410 is vibrated in a certain vibration mode, the optical low-pass filter 410 is vibrated in another different vibration mode. Consequently, the foreign substance having been left after the vibration in the former vibration mode can be removed by the vibration in the latter vibration mode. In this case, when a node in the former vibration mode overlaps a node in the latter different vibration mode, a foreign substance located at a part corresponding to the overlapping node cannot be removed. Therefore, vibration modes to be used should be selected such that nodes respectively corresponding to different vibration modes do not overlap one another. Accordingly, a desired combination of vibration modes to be used is that of a vibration mode having an even number of nodes (odd-order vibration mode) and a vibration mode having an odd number of nodes (even-order vibration mode). According to the present embodiment, a combination of a seventh-order vibration mode (having eight nodes) and an eighth-order vibration mode (having nine nodes) is used.

The resonant frequency of the optical low-pass filter 410 varies with a shape, thickness, and material of the optical low-pass filter 410. It is useful for preventing generation of noise to select a value of a resonant frequency to be outside an audible range.

Although an example of generating vibrations in the seventh-order vibration mode and the eighth-order vibration mode has been described in the present embodiment, the vibration modes to be used are not limited thereto. Vibrations can be generated in other order vibration modes. Three or more types of vibration modes can be used.

Figure 9B:
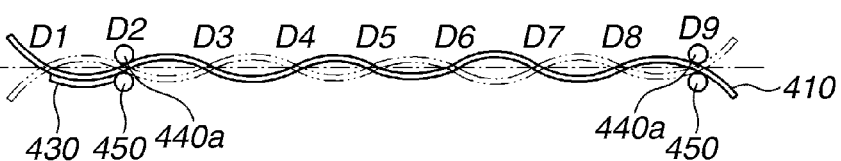

FIGS. 9A and 9B illustrate the vibration configurations of the optical low-pass filter 410 and the piezoelectric element 430, and a position, at which the optical low-pass filter 410 is supported. The present embodiment generates vibrations in the seventh-order vibration mode and the eighth-order vibration mode. FIGS. 9A and 9B illustrate the vibration configuration of vibrations in the eighth-order vibration mode. The vibrations are generated substantially in parallel with a longer side of the piezoelectric element 430.

As illustrated in FIG. 9B, the optical low-pass filter 410 is supported and sandwiched between the biasing member 440 and the elastic member 450.

The shape of the biasing member 440 is described below with reference to FIG. 10. FIG. 10 is a perspective view of the biasing member 440. The biasing member 440 is formed by punching out and bending a thin stainless-steel plate. The biasing member 440 has a property of a plate spring as a whole. Four contacts 440a are formed on the biasing member 440 by denting such that the biasing member 440 contacts the surface of the optical low-pass filter 410 at four places. The biasing members 440 are caught and held by the optical low-pass filter holding member 420 at claw portions 440c. Thus, the biasing member 440 biases the optical low-pass filter 410 towards the image sensor 33. That is, the biasing member 440 supports the optical low-pass filter 410 only at the four contacts 440a on the subject side. The biasing members 440 has a grounding portion 440b for connecting the surface of the optical low-pass filter 410 to the ground.

As illustrated in FIG. 9A, the optical low-pass filter 410 contacts the biasing member 440 at the four contacts 440a outside the imaging effective area 410a. A rectangular portion of the optical low-pass filter 410 is closely attached to and contacts the elastic member 450 outside the imaging effective area 410a.

Generally, when an object contacts a vibrating thing, vibrations of the thing are attenuated. However, in a case where an object contacts a portion corresponding to a node at which the amplitude of the vibration is substantially zero, the attenuation of the vibration is alleviated. Thus, the four places (contacts 440a), at which the biasing member 440 contacts the optical low-pass filter 410, and two sides of the rectangular portion parallel with nodes, at which the elastic member 450 contacts the optical low-pass filter 410, are provided in the vicinity of nodes of a vibration (nodes D2 and D9 illustrated in FIGS. 9A and 9B). The amplitude of the vibration is small in the vicinity of the nodes. Thus, the attenuation of the vibration of the optical low-pass filter 410 is alleviated. Consequently, the optical low-pass filter 410 can be supported without reducing foreign-substance removing ability for the optical low-pass filter 410.

Figure 11:
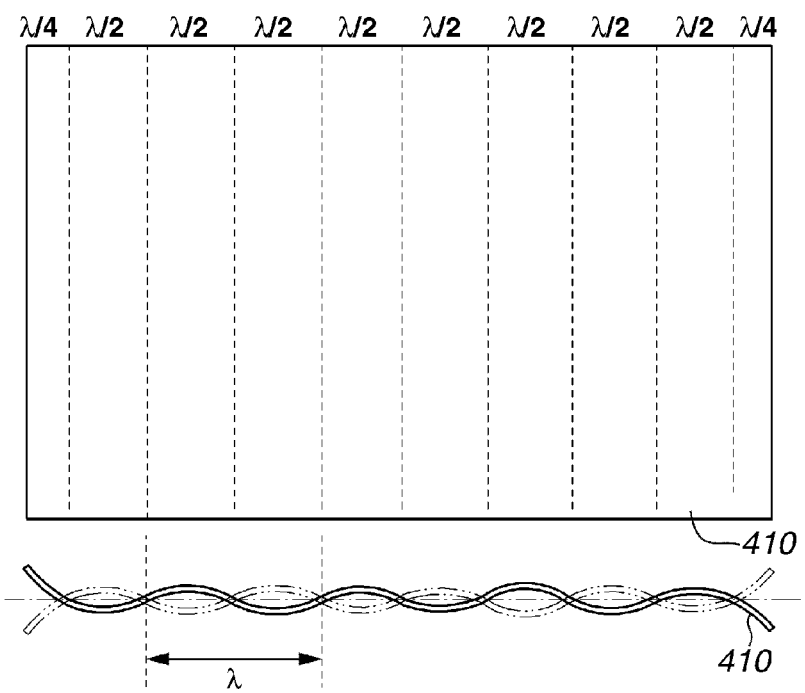
FIGS. 11A and 11B illustrate a vibration configuration of the optical low-pass filter in a case where the optical low-pass filter is singly vibrated.

In a vibration mode in which nodes are generated only in a direction parallel with one of the sides (shorter side) of the substantially rectangular optical low-pass filter 410, places at which nodes are generated can be determined very clearly. FIGS. 11A and 11B illustrate a vibration configuration of the optical low-pass filter 410 in a case where the optical low-pass filter 410 is singly vibrated. More particularly, FIGS. 11A and 11B illustrate the vibration configuration in the eighth-order vibration mode. In FIG. 11A, dashed lines represent nodes of the vibration.

As illustrated in FIGS. 11A and 11B, outermost nodes of a vibration of the optical low-pass filter 410 are respectively generated in an illustrated range at places located at a distance of ¼ of a wavelength of the vibration inward from both the shorter sides (two sides parallel with portions respectively corresponding to the outermost nodes) of the optical low-pass filter 410. In addition, nodes of the vibration of the optical low-pass filter 410 are generated in the illustrated range at places located inward at intervals of ½ the wavelength of the vibration from the place at which each of the outermost nodes is generated. The "wavelength" of the vibration is defined as an interval between adjacent antinodes of the same phase (horizontal distance from a top of a wave to an adjacent top of the wave (or distance from a bottom of a wave to an adjacent bottom of the wave), as viewed in, e.g., FIG. 11B). In this case, the wavelength is a distance designated by $\lambda$ in FIG. 11B. Accordingly, it is desirable that a position (place), at which the optical low-pass filter 410 is supported, at a side (vibrating-device side), at which the piezoelectric element 430 is disposed, is a position corresponding to a node (node D2 illustrated in FIG. 9B) nearest to the piezoelectric element 430 at the imaging optical axis side from the position to which the piezoelectric element 430 is stuck. In addition, it is desirable that a position, at which the optical low-pass filter 410 is supported, at a side (free-end side), at which the piezoelectric element 430 is not disposed, is a position corresponding to a node (node D9 illustrated in FIG. 9B) located inward at a distance of ¼ the wavelength from the end. In this case, it is experimentally confirmed that the above-described "vicinity of nodes" is a range from ⅛ the wavelength to ⅜ the wavelength. In a case where the optical low-pass filter 410 is supported in this range, the attenuation of the vibration of the optical low-pass filter 410 is mitigated, and the foreign-substance removing ability is not reduced.

Particularly, in a case where the optical low-pass filter 410 is supported at a portion other than that corresponding to the node of the vibration at the side (free-end side) at which the piezoelectric element 430 is not provided, the amplitude of the vibration is largely attenuated. Thus, the force (or acceleration) required to remove a foreign substance cannot be generated. Consequently, it is very significant that the optical low-pass filter 410 is supported at a portion corresponding to a node without selecting portions other than those corresponding to nodes. On the other hand, in the case of the vibration at the side (vibrating-device side) at which the piezoelectric element 430 is disposed, the vibration source (the piezoelectric element 430) is provided near the portion corresponding to the node. Thus, the attenuation of the vibration, which is caused by supporting the optical low-pass filter 410 at a portion other than that corresponding to a node, is small, as compared with that of the amplitude of the vibration at the free end. The present embodiment uses a combination of the seventh-order vibration mode and the eighth-order vibration. However, it will be described below which of the vibration modes is used to define nodes corresponding to portions at which the optical low-pass filter 410 is supported.

With the above-described configuration, the size of the outer shape of the optical low-pass filter 410 can be reduced. Thus, the miniaturization of the optical apparatus can be achieved, while the cost thereof can be reduced. In addition, because the place, at which the node is generated, is clearly determined, the place, at which the node is generated, can easily be calculated by determining the dimensions of the outer shape of the optical low-pass filter 410 and the order of a vibration to be generated. For example, in a case where a vibration is generated in a ninth-order vibration mode in a rectangular member having a length of 50.0 mm, the positions of outermost nodes to be generated are located at a distance of 2.5 mm from both ends of the range, and those of the other nodes to be generated are located at intervals of 5.0 mm from those of the outermost nodes. Thus, the positions, at which the optical low-pass filter 410 is supported, can easily be specified. Consequently, design of support components can easily be achieved.

As illustrated in FIGS. 9A and 9B, a position, to which the piezoelectric element 430 is bonded and fixed, includes an antinode of the vibration in the vibration mode generated in the optical low-pass filter 410. That is, it is desirable to fix the piezoelectric element 430 such that the piezoelectric element 430 overlaps a center line between the nodes in the vibration mode. In addition, it is desirable that a length (width) in a direction of a shorter side (a direction perpendicular to a portion corresponding to a node of the vibration) of the piezoelectric element 430 is equal to or less than ½ the wavelength $\lambda$ in a vibration mode to be generated. This is because a large amplitude of the vibration can efficiently be generated according to a low voltage to be applied thereto without obstructing a stationary wave vibration (natural vibration) by adhesive-bonding the piezoelectric element 430 and the optical low-pass filter 410 such that a portion of the piezoelectric element 430, which expands and shrinks according to the voltage applied thereto, is adjusted to an antinode of the vibration of the optical low-pass filter 410.

According to the present embodiment, in the case of using a plurality of vibration modes, the wavelength in the vibration mode, which is longest as compared with the wavelengths in the other vibration modes, is used as a reference wavelength. The length (width) in the direction of the shorter side (direction perpendicular to a node of the vibration) of the piezoelectric element 430 is set to be equal to or less than ½ the reference wavelength. The piezoelectric element 430 is disposed such that a portion, at which the piezoelectric element 430 is disposed, includes antinodes of all the used vibration modes. According to the present embodiment, the length in the direction of the shorter side of the piezoelectric element 430 is equal to or less than ½ the wavelength in the seventh-order vibration mode. The piezoelectric element 430 is disposed such that a portion, at which the piezoelectric element 430 is disposed, includes antinodes of both the seventh-order vibration mode and the eighth-order vibration mode. That is, the piezoelectric element 430 is securely fixed to a portion that overlaps both a center line between nodes generated in the seventh-order vibration mode and that between nodes generated in the eighth-order vibration mode.

As described above, it is desirable that the position, at which the optical low-pass filter 410 is supported, is the position of the node nearest to the piezoelectric element 430 at the imaging optical axis side from the position, to which the piezoelectric element is stuck, at the side at which the piezoelectric element 430 is disposed. On the other hand, it is desirable that at the side, at which the piezoelectric element 430 is not disposed, the position, at which the optical low-pass filter 410 is supported, is the position of the node located inward from the end by ¼ the wavelength.

Figure 12:
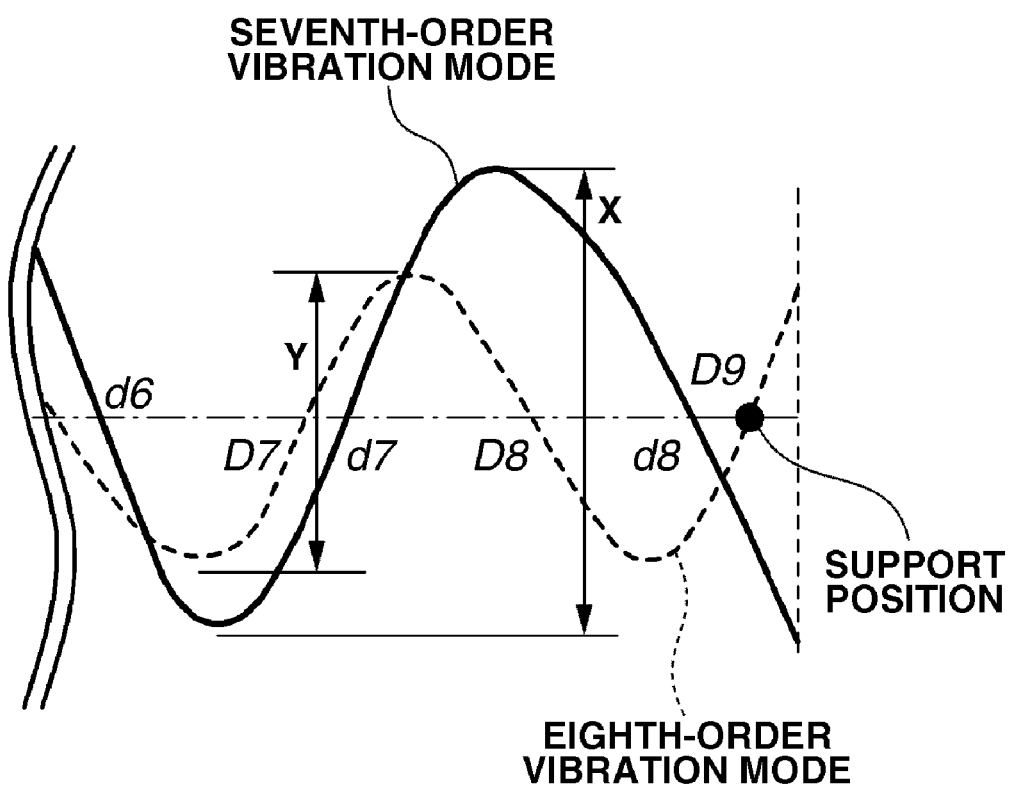
FIG. 12 is a schematic side view illustrating a vibration configuration at a side of the optical low-pass filter, on which no piezoelectric element is arranged.

The position, at which the optical low-pass filter is supported, in the case of using a plurality of vibration modes is described below. FIG. 12 is a side view illustrating a vibration configuration at a side (free-end side) of the optical low-pass filter 410, on which the piezoelectric element 430 is not disposed, in the case of using the seventh-order vibration mode and the eighth-order vibration mode. As illustrated in FIG. 12, nodes (d6, d7, d8, D7, D8, D9) generated in the two vibration modes do not overlap one another. An amplitude (X) of the vibration in the seventh-order vibration mode differs from that (Y) of the vibration in the eighth-order vibration mode such that X>Y. As described above, it is useful for removing a foreign substance, such as dust, adhering to the surface of the optical low-pass filter 410 to apply a force greater than the adhesion force, i.e., a necessary acceleration, to the foreign substance. Thus, a voltage to be applied thereto is determined by considering the eighth-order vibration mode, in which the amplitude of the vibration is small, such that the necessary acceleration for removing a foreign substance, such as dust, is generated.

Figure 13:
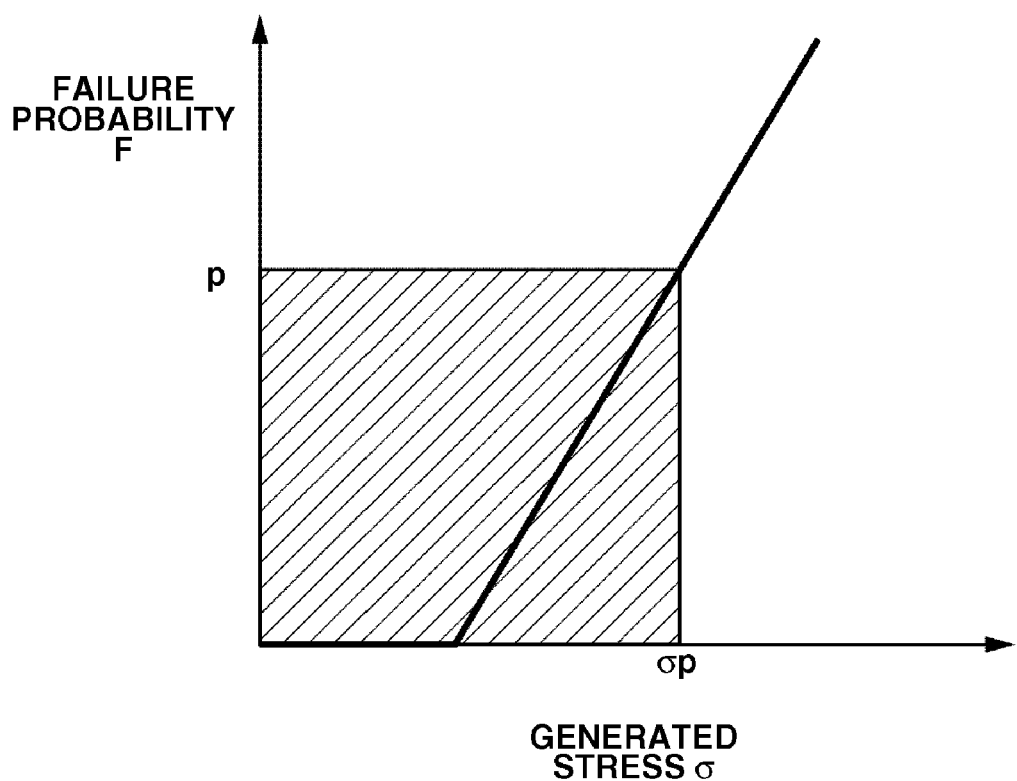
FIG. 13 schematically illustrates a relationship between failure probability and generated stress.

At that time, in the seventh-order vibration mode, in which the amplitude of the vibration is larger than that of the vibration in the eighth-order vibration mode, generated stress is increased due to the fact that the amplitude is large. Thus, failure probability of the optical low-pass filter 410 is increased. There is a fear that breakage of the optical low-pass filter 410 may occur. Generally, it is useful to discuss the failure probability using a Weibull distribution. FIG. 13 illustrates the failure probability using a Weibull distribution. In FIG. 13, an abscissa axis represents a logarithmic scale of the generated stress δ. An ordinate axis represents a logarithmic scale of the failure probability F. Information illustrated in FIG. 13 is obtained by performing a flexure test using a large number of samples. As is apparent from FIG. 13, the failure probability F increases accordingly as the generated stress δ increases. It is necessary for using the optical low-pass filter 410 at the failure probability, which is equal to or less than a value p, to set the stress generated in the optical low-pass filter 410 to be equal to or less than a value σp (corresponding to a shaded portion in FIG. 13). The failure probability p is determined in consideration of an amount of produced imaging units 400.

Thus, as illustrated in FIG. 12, the position, at which the optical low-pass filter 410 is supported, is set to be on a portion corresponding to the node D9 in the eighth-order vibration mode, which is illustrated in FIG. 12. The portion corresponding to a node includes a neighborhood of a point corresponding to the node. Actually, it is sufficient that the portion of the optical low-pass filter 410, which is located inward from the free end within a range of distances from ⅛ the wavelength to ⅜ the wavelength. That is, the amplitude of the vibration can be attenuated by supporting the optical low-pass filter 410 at a portion other than the portion corresponding to the node of the seventh-order vibration mode. On the other hand, the attenuation of the amplitude can be prevented, without reducing the ability to remove a foreign substance, by supporting the optical low-pass filter 410 at a portion corresponding to a node of the eighth-order vibration mode. In addition, it is required to adjust the position, at which the optical low-pass filter 410 is supported, in the vicinity of a portion corresponding to the node of the vibration in the eighth-order vibration mode so as to prevent the ability to remove a foreign substance in the seventh-order vibration from becoming lower than the ability to remove a foreign substance in the eighth-order vibration mode due to the attenuation of the amplitude of the vibration in the seventh-order vibration mode. Accordingly, according to circumstances, the optical low-pass filter 410 can be supported at a portion close to the portion corresponding to the node in the eighth-order vibration mode between the portion corresponding to the node of the vibration in the seventh-order vibration mode and that of the vibration in the eighth-order vibration mode. Consequently, the amplitude of the vibration in the seventh-order vibration mode of the optical low-pass filter 410 can be attenuated such that the generated stress is equal to or less than value σp. Accordingly, the optical low-pass filter 410 can be prevented from being broken due to the vibration thereof.

The above-described idea is applicable to the position, at which the optical low-pass filter 410 is supported, at the side (vibrating-device side), at which the piezoelectric element 430 is disposed. It is desirable that the optical low-pass filter 410 is supported at a portion corresponding to the node of the vibration in the eighth-order vibration mode.

Although the present embodiment uses two vibration modes, i.e., the seventh-order vibration mode and the eighth-order vibration mode, it is advisable to support, in a case where three or more vibration modes are used, the optical low-pass filter 410 at a position on or in the vicinity of the portion corresponding to the node of a vibration in the vibration mode, whose amplitude is smallest, among the three or more vibration modes to be used. Consequently, the optical low-pass filter 410 can be prevented, without reducing the ability to remove a foreign substance, such as dust, from being broken.

As above described, a foreign substance, such as dust, can be removed by vibrating the rectangular optical low-pass filter 410 provided in the imaging apparatus. Thus, there is no fear of reduction in optical performance, such as transmissivity of an imaging light-beam. Because it is sufficient to vibrate the optical low-pass filter 410 having substantially the same shape as that of a rectangular imaging effective area needed for imaging, efficient layout can be achieved. In addition, an efficient driving operation can be implemented by supporting the optical low-pass filter 410 at a position at which the vibration thereof is not obstructed. Consequently, the size of the imaging apparatus can be prevented from increasing.

The optical member according to the present embodiment is not limited to the optical low-pass filter 410. For example, although the present embodiment is configured to excite a stationary wave vibration in the quartz birefringent plate, lithium niobate can be used as the material of the birefringent plate, instead of quartz. Alternatively, the optical apparatus can be configured such that a stationary wave vibration is excited in an optical low-pass filter configured by bonding a birefringent plate, a phase plate, and an infrared absorbing filter, or in an infrared absorbing filter. Alternatively, the optical apparatus can be configured such that a stationary wave vibration is excited in a glass plate disposed in front of a birefringent plate.

Figure 14:
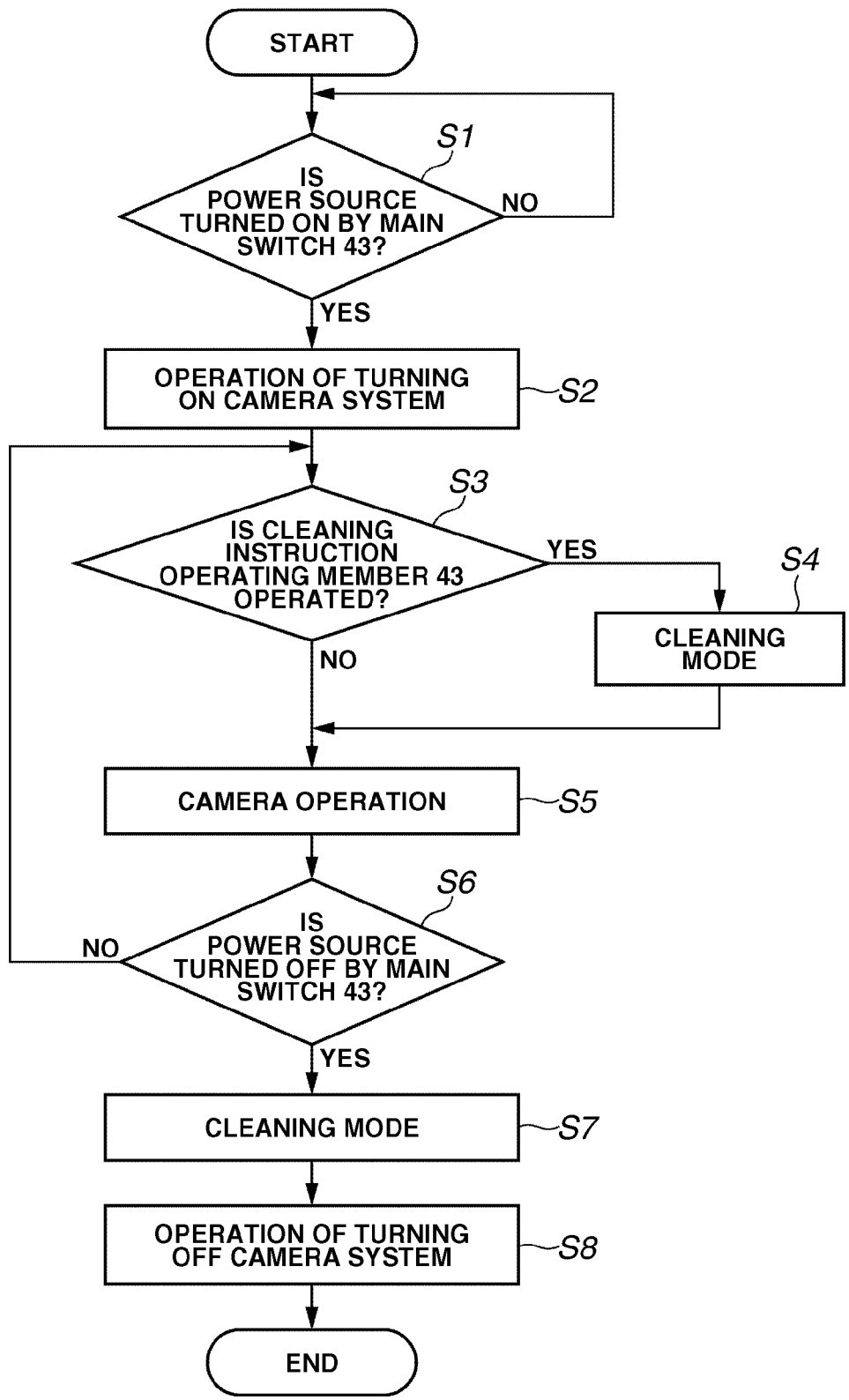
FIG. 14 is a flowchart illustrating an operation for removing a foreign substance, such as dust, adhering to the surface of the optical low-pass filter.

Next, an operation for removing a foreign substance, such as dust, adhering to the surface of the optical low-pass filter 410 is described below with reference to FIG. 14. In step S1, the MPU 100 determines whether the power source 42 is turned on by the main switch 43. If the power source 42 is turned on (YES in step S1), the MPU 100 performs processing for starting a camera system in step S2. The MPU 100 controls the power supply circuit 110 to supply electric power to each circuit. Then, the MPU 100 initializes the system. Thus, the MPU 100 performs an operation of turning on the camera system to enable the camera to perform an imaging operation.

Next, in step S3, the MPU 100 determines whether the cleaning instruction operating member 44 is operated by a photographer. If the cleaning instruction operating member 44 is operated (YES in step S3), the MPU 100 proceeds to step S4. If the cleaning instruction operating member 44 is not operated (NO in step S3), the MPU 100 proceeds to step S5. Although the present embodiment is provided with the cleaning instruction operating member 44, an operating member for instructing transition to a cleaning mode according to the present invention is not limited thereto. The operating member for instructing transition to a cleaning mode is not limited to a mechanical button. A unit for instructing the transition to a cleaning mode according to a menu displayed in the color liquid-crystal monitor 19 using a cursor key or an instruction button can be used.

In step S4, the MPU 100 receives an instruction to start the cleaning mode and then causes the camera body 1 to perform transition to the cleaning mode. First, the power supply circuit 110 supplies electric power necessary for the cleaning mode to each component of the camera body 1. In parallel with this, the battery check circuit 108 detects a remaining battery level of the power source 42 and sends a result of detecting the remaining battery level to the MPU 100. When receiving a signal for starting the cleaning mode, the MPU 100 sends a drive signal to the piezoelectric element driving circuit 111. When receiving the drive signal from the MPU 100, the piezoelectric element driving circuit 111 generates a periodic voltage for exciting a stationary wave vibration of the optical low-pass filter 410. The piezoelectric element driving circuit 111 applies the generated periodic voltage to the piezoelectric element 430. The periodic voltage sequentially changes within a predetermined range of frequencies including a frequency for exciting a stationary wave vibration. The piezoelectric element 430 expands and shrinks according to the voltage applied thereto to cause a stationary wave vibration of the optical low-pass filter 410. Upon completion of the cleaning mode, the MPU 100 proceeds to step S5.

In step S5, the MPU 100 receives signals from the switch SW1 (7a), the switch SW2 (7b), the main-operation dial 8, the sub-operation dial 20, the photographing-mode setting dial 14, and other switches, and performs a camera operation. The camera operation is a mode in which generally known photographing using the camera and setting of the camera are performed. Detail description of the camera operation is omitted herein.

Next, in step S6, the MPU 100 determines whether the power source 42 is turned off by the main switch 43 in a standby state. If the power source 42 is turned off (YES in step S6), the MPU 100 proceeds to step S7. If the power source 42 is not turned off (NO in step S6), the MPU 100 returns to step S3.

In step S7, the MPU 100 performs a cleaning mode similar to that performed in step S4. Then, the MPU 100 proceeds to step S8. In the cleaning mode performed in step S7, parameters, such as a driving frequency, a driving time, and a control method corresponding to the piezoelectric element 430, can be made to differ from those used in step S4.

In step S8, the MPU 100 performs a control operation for terminating each circuit. Then, the MPU 100 stores necessary information in the EEPROM 100a. The MPU 100 controls the power supply circuit 110 to perform an operation of turning off the camera system, i.e., an operation of turning off the power source 42 to interrupt supply of electric power to each circuit.

As above-described, the cleaning mode is performed not only at any optional timing intended by a photographer but at the timing of turning off the power source 42. That is, after an operation of removing a foreign substance adhering to the surface of the optical low-pass filter 410 is performed, the operation of turning off the camera system is performed.

Although there are various foreign substances adhering to the surface of the optical low-pass filter 410, it is experimentally found that generally, when the optical low-pass filter 410 is left unattended for a long time in a state in which a foreign substance remains adhered thereto, it is difficult to remove the foreign substance even when the optical low-pass filter 410 is vibrated in the cleaning mode. This is considered to occur as a result of increasing an adhesion force, such as a liquid-bridging force, due to dew formation caused by change in environment (e.g., temperature and humidity) and of causing the foreign substance to adhere owing to repetition of swelling and drying thereof due to the change in environment. Elastic members, such as a rubber member, adhere because fats included in the elastic members bleed with time. Thus, it is more efficient and effective to perform the cleaning mode at the timing of performing an operation of turning off the power source 42, which may result in long-term disuse of the camera system with high possibility than to perform the cleaning mode at the timing of turning on the power source 42 after a long-term disuse state of the camera system, in which a foreign substance is highly likely to be difficult to remove.

Although an operation of turning off the power source 42 by the main switch 43 has been described in the present embodiment, an operation of turning off the camera system, which is similar to that of turning off the power source 42, can be performed after the lapse of a predetermined time in a power-source on-state. In this case, it is apparent that similar effects can be obtained by preliminarily performing the cleaning mode.

Effects of the present embodiment are summarized below. In the case of employing a foreign-substance removing structure in which a foreign substance adhering to the surface of the optical low-pass filter 410 is removed by vibrations, the piezoelectric element 430 is fixed close to and in parallel with one side of the rectangular optical low-pass filter 410. Thus, the optical low-pass filter 410 can be compacted and miniaturized. The cost of the optical low-pass filter 410 can be reduced. In addition, the number of piezoelectric elements 430 can be minimized. Consequently, the cost of the piezoelectric element 430 can be reduced. Excessive increase in the size of the camera can be prevented. According to the present embodiment, a relatively high-order stationary wave vibration mode is generated by a simple control operation of applying a periodic voltage to the single piezoelectric element 430 to resonate the optical member. Thus, no noises are generated. In addition, a foreign substance, such as dust, can efficiently be removed. A low-cost simple control operation and a circuit configuration therefor can be achieved. According to the present embodiment, an infrared absorbing filter or an optical low-pass filter, which is needed for a digital camera, is vibrated. Thus, there is no need for providing a dedicated dust-proof filter. Optical performance, such as transmissivity of an imaging light-beam, is not reduced.

Although an exemplary embodiment of the present invention applied to a digital camera has been described above, the present invention can be applied to an optical apparatus, such as a liquid crystal projector. In a case where a foreign substance, such as dust, adheres to the surface of an optical member of a projection optical system in an optical apparatus, such as a liquid crystal projector, a shadow of the foreign substance is projected. Thus, this problem can be solved by providing a configuration that is similar to that of the present embodiment to such an optical apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An optical apparatus comprising:
    a rectangular optical member provided on an optical axis; and
    a rectangular vibrating device disposed in parallel with one of four sides of the rectangular optical member and configured to vibrate the rectangular optical member,
    wherein in a case where the rectangular vibrating device vibrates the rectangular optical member, a plurality of nodes parallel with a longer side of the rectangular vibrating device appears to the rectangular optical member, and
    wherein the rectangular vibrating device vibrates the rectangular optical member in a first vibration mode and a second vibration mode, the number of the plurality of first nodes which appear when the rectangular vibrating device vibrates the rectangular optical member in the first vibration mode, and the number of the plurality of second nodes which appear when the vibrating device vibrates the rectangular optical member in the second vibration mode, are different with each other, a position of the plurality of first nodes which appear when the rectangular vibrating device vibrates the rectangular optical member in the first vibration mode, and a position of the plurality of second nodes when the vibrating device vibrates the rectangular optical member in the second vibration mode, are different with each other.

2. The optical apparatus according to claim 1, further comprising an image sensor configured to photoelectrically convert a subject image,
    wherein the rectangular optical member is located in front of the image sensor.

3. The optical apparatus according to claim 1, wherein when the number of the plurality of first nodes becomes an even number, the number of the plurality of second nodes becomes an odd number, and when the number of the plurality of first nodes becomes an odd number, the number of the plurality of second nodes becomes an even number.

4. The optical apparatus according to claim 1,
    wherein the rectangular vibrating device is disposed such that a longer side of the rectangular vibrating device is parallel with a short side of the rectangular optical member, and
    wherein a width of a shorter side of the rectangular vibrating device is equal to or less than ½ a wavelength of one vibration mode whose wavelength is longer between the first vibration mode and the second vibration mode.

5. The optical apparatus according to claim 4, wherein the rectangular vibrating device is fixed to overlap a center line between the first nodes and a center line between the second nodes.

6. The optical apparatus according to claim 1, wherein the rectangular optical member includes a filter.

7. The optical apparatus according to claim 1, further comprising a contacting member configured to contact the rectangular optical member,
    wherein the contacting member is formed on a contact portion which contacts to the rectangular optical member, the contact portion is formed on vicinity of one of the plurality of nodes which appears when vibrating the rectangular optical member, and the vicinity of the node is in a range from ⅛ the wavelength to ⅜ the wavelength.

8. The optical apparatus according to claim 1, further comprising a contacting member configured to contact the rectangular optical member,
    wherein the contacting member is formed on a contact portion which contacts to the rectangular optical member, the contact portion is formed on vicinity of one of the plurality of nodes when vibrating the rectangular optical member in vibration mode having smaller amplitude of a vibration between the first vibration mode and the second vibration mode.

9. An optical apparatus comprising:
    a rectangular optical member provided on an optical axis; and
    a rectangular vibrating device stuck to the rectangular optical member close to and in parallel with one of four sides of the rectangular optical member and configured to vibrate the rectangular optical member in a wave fashion to have a plurality of nodes parallel with the one side,
    wherein the rectangular vibrating device is configured to operate in two or more vibration modes differing from one another at least in number or positions of the plurality of nodes,
    wherein the two or more vibration modes include a vibration mode for vibrating the rectangular optical member in a wave fashion to have an even number of nodes, and a vibration mode for vibrating the rectangular optical member in a wave fashion to have an odd number of nodes.

10. An optical apparatus comprising:
    a rectangular optical member provided on an optical axis; and
    a rectangular vibrating device stuck to the rectangular optical member close to and in parallel with one of four sides of the rectangular optical member and configured to vibrate the rectangular optical member in a wave fashion to have a plurality of nodes parallel with the one side,
    wherein the rectangular vibrating device is configured to operate in two or more vibration modes differing from one another at least in number or positions of the plurality of nodes,
    wherein the rectangular vibrating device includes a rectangular piezoelectric member,
    wherein the rectangular vibrating device is disposed such that a longer side of the rectangular vibrating device is parallel with one side of the rectangular optical member, and
    wherein a width of a shorter side of the rectangular vibrating device is equal to or less than ½ a wavelength of a vibration mode whose wavelength is longest among the two or more vibration modes.

11. An optical apparatus comprising:
    a rectangular optical member provided on an optical axis; and
    a rectangular vibrating device stuck to the rectangular optical member close to and in parallel with one of four sides of the rectangular optical member and configured to vibrate the rectangular optical member in a wave fashion to have a plurality of nodes parallel with the one side,
wherein the rectangular vibrating device is configured to operate in two or more vibration modes differing from one another at least in number or positions of the plurality of nodes,
wherein the rectangular vibrating device is fixed to overlap a center line between nodes in each of the two or more vibration modes.

* * * * *